United States Patent [19]

Austin et al.

[11] 4,151,231
[45] Apr. 24, 1979

[54] ROTARY SURFACE AERATORS

[75] Inventors: Eric P. Austin, Sandbach; William S. Robertson, Stone, both of England

[73] Assignee: Simon-Hartley Limited, Staffordshire, England

[21] Appl. No.: 859,673

[22] Filed: Dec. 12, 1977

Related U.S. Application Data

[63] Continuation of Ser. No. 744,439, Nov. 23, 1976, abandoned.

[30] Foreign Application Priority Data

Jan. 10, 1976 [GB] United Kingdom .................. 927/76

[51] Int. Cl.² ............................................. B01F 3/04
[52] U.S. Cl. ...................................... 261/91; 416/182
[58] Field of Search .................... 261/87, 88, 91, 93, 261/123; 416/182

[56] References Cited

U.S. PATENT DOCUMENTS

| 2,054,395 | 9/1936 | Streander | 261/88 X |
| 3,182,972 | 5/1965 | Alsop et al. | 261/91 X |
| 3,323,782 | 6/1967 | Clough | 261/91 X |
| 3,497,185 | 2/1970 | Dively | 261/91 X |
| 3,741,682 | 6/1973 | Robertson | 261/91 X |
| 3,814,395 | 6/1974 | Kaelin | 261/91 X |

FOREIGN PATENT DOCUMENTS

| 355471 | 10/1971 | Japan | 261/91 |
| 1387924 | 3/1975 | United Kingdom | 261/91 |

Primary Examiner—Richard L. Chiesa
Attorney, Agent, or Firm—Norris & Bateman

[57] ABSTRACT

An aerator comprising a support member in the form of a flat plate which is adapted, when the aerator is in use, to lie in a horizontal plane and to be rotated about its central vertical axis, a plurality of angularly spaced blades secured to the underside of said plate and each extending radially from a central region thereof towards its periphery, each said blade having a maximum depth beneath a horizontal datum at a position intermediate its ends, and being provided with a plate secured to its lower edge and extending on both sides of the blade along at least a portion of that part of the length of the blade between its outer end and the position of maximum depth.

12 Claims, 4 Drawing Figures

ROTARY SURFACE AERATORS

This is a continuation of application Ser. No. 744,439, filed Nov. 23, 1976 now abandoned.

This invention concerns a rotary surface aerator of the kind which is adapted to be rotated in the surface of a liquid for the purpose of agitating and aerating same, and particularly, though by no means exclusively, suitable for use in the aeration of sewage liquors in the so-called activated sludge process.

An aerator is known which comprises a support member in the form of an inverted conical shell having a plurality of angularly spaced blades secured to its underside and each extending tangentially from a circular locality at the centre of the support member towards the outer periphery thereof, there being a plate secured to the lower edge of each said blade and extending on both sides thereof along at least a part of the length of the blade beneath said shell from the outer end of the blade towards the centre of the aerator.

The rotation of aerators at high speeds is becoming increasingly popular as means of reducing the cost of the gear boxes which must be provided between the aerators and the driving motors therefor. This is particularly true in the case of the larger sizes of aerator when the torque to be transmitted is such that the gear boxes can account for up to half of the total cost of an aerator installation.

We have found that an aerator as described above, whilst highly satisfactory at low rotational speeds, develops problems at higher speeds, when complex power consumption/oxygen tranfer characteristics occur, making control extremely difficult having regard to other variable parameters such as the oxygen demand of the liquid being treated and the depth of immersion of the aerator in the surface of the liquid being treated.

It is an object of the present invention to provide an aerator capable of being operated at high speeds and without the disadvantages aforesaid.

According to the present invention, an aerator comprises a support member in the form of a flat plate which is adapted when the aerator is in use to lie in a horizontal plane and to be rotated about its central vertical axis, a plurality of angularly spaced blades secured to the underside of said plate and each extending radially from a central region thereof towards its periphery, each said blade having a maximum depth beneath a horizontal datum at a position intermediate its ends, and being provided with a plate secured to its lower edge and extending on both sides of the blade along at least a portion of that part of the length of the blade between its outer end and the position of maximum depth.

We have found that an aerator embodying the invention will perform in a particularly satisfactory manner at higher rotational speeds when baffle means is provided therebeneath for the purposes of preventing rotational flow or swirling of the liquid being aerated immediately beneath the position of the aerator.

Thus, the invention also includes an installation for the aeration of a liquid comprising the combination of an aerator as aforesaid with baffle means mounted therebeneath and so arranged as to prevent rotational flow of the liquid in a region immediately beneath the position of the aerator.

The invention will be further apparent from the following description with reference to the several figures of the accompanying drawings which show, by way of example only, one form of rotary surface aerator embodying the invention.

Figure 1:
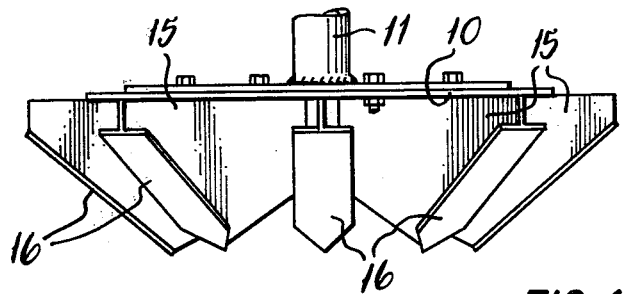
FIG. 1 shows a side elevation of the aerator.
Figure 4:
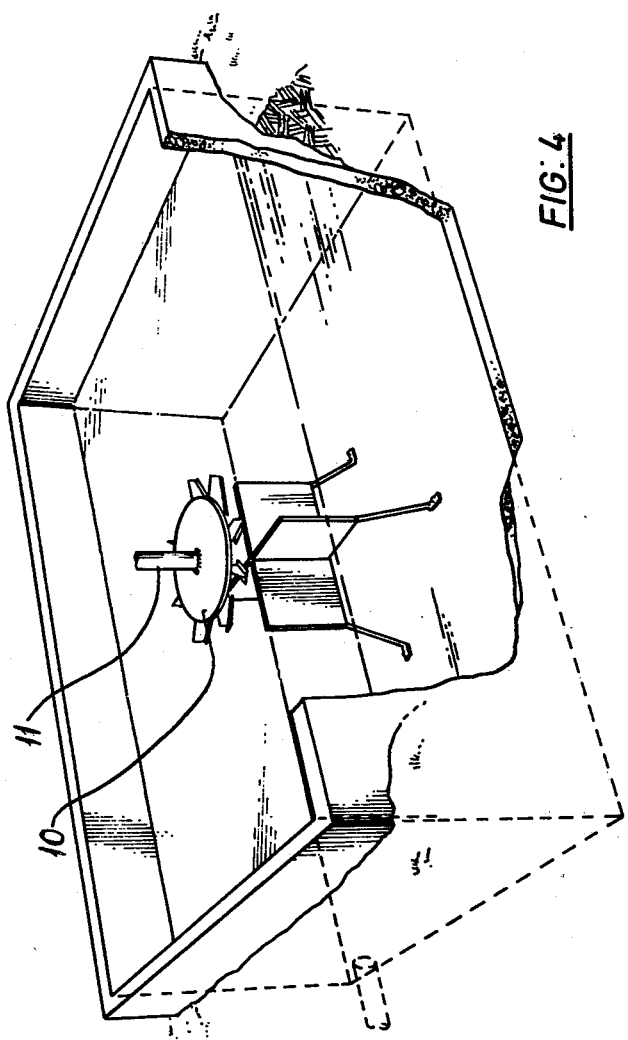

and FIG. 4 shows a perspective view of the aerator of FIG. 1 in position in an aeration tank with baffle means mounted therebeneath.

Figure 3:
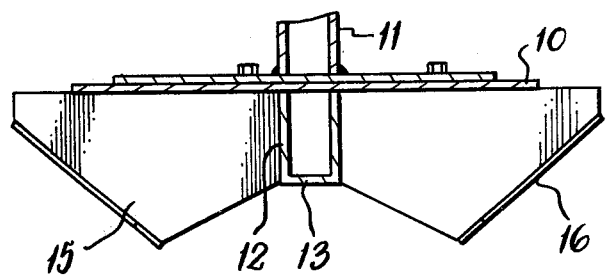
FIG. 3 shows a cross-section through the aerator on the line III—III of FIG. 2.
Figure 2:
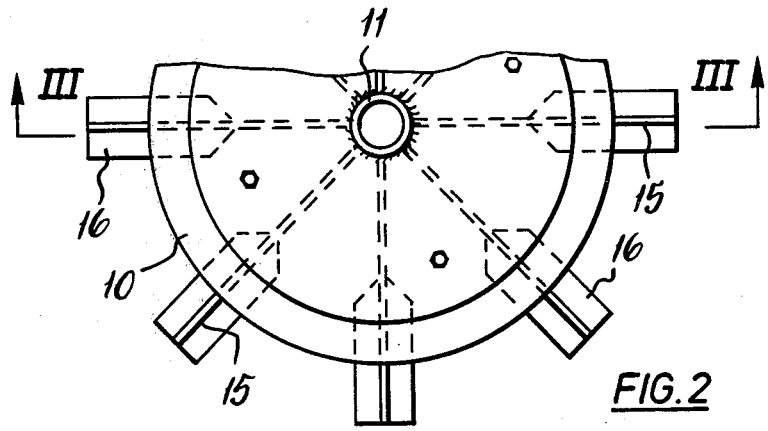
FIG. 2 shows a plan view of the aerator of FIG. 1.

Referring now to the drawings, and more particularly FIGS. 1 to 3 inclusive, it will be seen that the aerator essentially comprises a support member 10 in the form of a flat circular disc, which, when the aerator is in use, lies in a horizontal plane, and which can be rotated by means of a shaft 11 which is secured centrally to the disc 10 so as to extend upwardly therefrom. Extending downwardly from the underside of the disc 10 at its centre is a circular boss 12 formed from tube and closed at its lower end by a circular plate 13.

Secured to the underside of the support member 10 are a plurality of angularly spaced blades 15 each disposed in a vertical plane. As best seen from FIG. 2, each of the blades 15 extends radially and outwardly from the periphery of the circular boss 12 to terminate at a position lying beyond the peripheral edge of the support member 10. Each blade 15 is profiled, as best seen from FIG. 3, so as to have a maximum depth beneath a horizontal datum at a position intermediate its ends, the depth of the blade on either side of this position reducing gradually. As also best seen from FIG. 3 the upper edge of each blade 15 extends continuously from the periphery of the support member 10 in contact with the underside thereof to the circular boss 12. Likewise the inner edge of each blade 15 extends continuously downwardly in contact with the periphery of the boss 12 for a distance not substantially less than the depth of the boss 12. The outermost edge of each blade 15 is of substantially less height than the inner edge thereof.

Secured to the lower edge of each blade 15 between the position of maximum depth thereof and the outer end of the blade is a plate 16 which extends on both sides of the blade normal thereto, as clearly seen from FIGS. 1 and 2.

In use, the aerator is rotated in the surface of a liquid which is to be agitated and aerated. It will be understood that liquid is thrown outwardly by centrifugal action through the duct defined on the leading side of each blade with respect to the direction of rotation by the support member 10, blade 15 and plate 16 and that air is drawn down the duct on the trailing side of each blade with respect to the direction of rotation and defined by the same parts. This air is drawn into the region of maximum turbulence thus ensuring a good transfer of oxygen to the liquid being aerated.

When the aerator is to be rotated at the higher end of its useful speed range, as is preferred, it is desirable to provide baffle means to prevent rotational flow or swirling of the liquid at a position immediately beneath the aerator. As can clearly be seen from FIG. 4, such baffle means may conveniently be comprised by four plates lying in vertical planes and forming a cross whose axis is coincident with the rotary axis of the aerator.

Tests with aerators having the contruction described above have shown that there is a simple relationship between oxygen transfer and power consumption regardless of speed of rotation and depth of immersion, thus making control of the aerator on site particularly straightforward.

We have also observed that aerators embodying the present invention do not have a great tendency to cause the liquid being aerated to surge, and thus have a consequent tendency to allow the power input to remain constant during operation.

It will be appreciated that it is not intended to limit the invention to the above example only, many variations, such as might readily occur to one skilled in the art, being possible without departing from the scope thereof, as defined in the appended claims.

Thus, for example, the blades 15 need not extend from the periphery of a circular boss and may all meet at the vertical axis of the machine.

Again, for example, the plates 16 need not extend from the outer ends of the blades 15 but from positions inwardly of such ends.

Yet again, for example, the blades 15 need not extend outwardly beyond the periphery of the disc 10 but may terminate at the periphery or even at positions radially and inwardly thereof.

Still again, for example, the disc 10 may be replaced by a plate of other than circular shape.

What is claimed is:

1. A rotary aerator of the type which achieves a gas liquid interface between air and the liquid by causing air to flow downwardly into the liquid along trailing blade surfaces comprising a support member in the form of a flat plate which is adapted, when the aerator is in use, to lie in a horizontal plane and to be rotated about its central vertical axis, a plurality of angularly spaced flat blades secured to the underside of said plate and each extending radially from a central region thereof towards its periphery, each said blade having a maximum depth beneath a horizontal datum at a position intermediate its ends, and being provided with a plate secured to its lower edge and extending on both sides of the blade along at least a portion of that part of the length of the blade between its outer end and the position of maximum depth, the upper edge of each blade extending freely outwardly beyond the outer periphery of the support plate so that it offers no obstruction to egress of liquid from its leading side and said plates on the lower edges of said blades being circumferentially spaced along their entire lengths.

2. An aerator according to claim 1 wherein said support plate is in the form of a circular disc.

3. An aerator according to claim 1 wherein each said blade lies in a vertical plane and has its inner end abutting the periphery of a circular boss which depends from the underside of the support plate.

4. An aerator according to claim 1 wherein the depth of the blade reduces gradually to either side of the position of maximum depth.

5. An aerator according to claim 4 wherein the outer edge of each blade is of less height than the inner edge thereof.

6. An aerator according to claim 1 wherein each said plate which is secured to the lower edge of a blade is normal to the blade.

7. An aerator according to claim 1 wherein each said plate secured to the lower edge of a blade extends continuously from the outer edge of the blade to the position of maximum depth.

8. The combination of an aerator according to claim 1 with a vessel adapted to contain liquid to be aerated, said aerator being mounted over the vessel and adapted to be rotated in the surface of liquid contained within the vessel, and baffle means in the vessel situated directly beneath the aerator to prevent rotational flow or swirling of liquid immediately beneath the aerator.

9. The combination according to claim 8 wherein said baffle is comprised by four plates lying in a vertical plane and forming a cross whose axis is coincident with the rotary axis of the aerator.

10. The aerator defined in claim 1, wherein each of the radially extending flat plates is so secured to the lower edge of its associated blade that there is no space between that lower edge of the blade and that flat plate.

11. The aerator defined in claim 10, wherein the said blades and the flat plates secured along the lower edges thereof are of substantially identical structure and size.

12. The rotary aerator defined in claim 1, wherein the lower edge of each said blade has an inclined portion that extends upwardly and outwardly to terminate radially outwardly of said support member, and the plate on each blade extends substantially the entire length of said inclined portion of said lower edge.

* * * * *